United States Patent Office 3,639,666
Patented Feb. 1, 1972

3,639,666
SPIROADAMANTANETHIAZEPINONES AND
DERIVATIVES THEREOF
Venkatachala Lakshmi Narayanan, North Brunswick,
N.J., assignor to E. R. Squibb & Sons, Inc., New York,
N.Y.
No Drawing. Filed Mar. 14, 1969, Ser. No. 807,448
Int. Cl. C07d 93/40
U.S. Cl. 260—239.3 B                    9 Claims

ABSTRACT OF THE DISCLOSURE

New antidepressants have been found which have the general formula

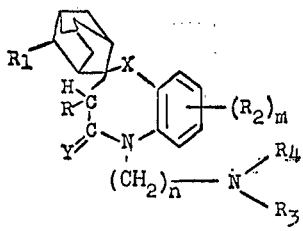

SUMMARY OF THE INVENTION

This invention relates to new spiroadamantanethiazepinones and derivatives thereof of the general formula (I)

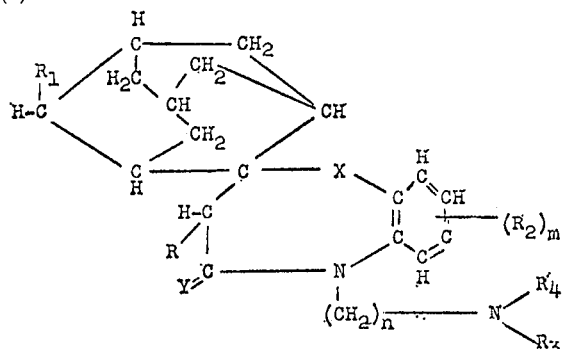

and to acid addition salts thereof.

In Formula I, the symbols have the following meanings: R represents hydrogen or lower alkyl; $R_1$ represents hydrogen, halo, hydroxy, lower alkyl, phenyl or lower alkoxy; $R_2$ represents hydrogen, lower alkyl, trihalomethyl, lower alkoxy or halo; X represents thia (—S—), sulfinyl

or sulfonyl (—SO$_2$—); Y represents H$_2$

or oxo (O=); the group

represents a basic nitrogen containing radical of less than 14 carbon atoms; m represents an integer from 1 to 3 and n represents an integer from 1 to 4.

The lower alkyl groups represented by the various symbols include straight and branched chain saturated aliphatic groups of up to seven carbons such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen.

Each of the four halogens is contemplated by the term "halo," but chlorine and bromine are preferred. In the trihalomethyl group, trifluoromethyl is preferred.

In the basic nitrogen containing radical symbolized by the group (II) 

$R_3$ and $R_4$ each represents hydrogen, lower alkyl, hydroxy-lower alkyl, phenyl-lower alkyl or 1-adamantyl (preferably only one) forming such basic groups as amino, lower alkylamino, e.g., methylamino, ethylamino, di(lower alkyl)amino, e.g., dimethylamino, diethylamino, dipropylamino, (hydroxy-lower alkyl)amino, e.g., β-hydroxyethylamino, di(hydroxy-lower alkyl)amino, e.g., di(hydroxyethyl)amino, phenyl(lower alkyl)amino, e.g., benzylamino, phenethylamino and 1-adamantylamino.

In addition, the nitrogen may join with the groups represented by $R_3$ and $R_4$ to form a 5 to 7 membered monocyclic heterocyclic containing, if desired, an oxygen, sulfur or an additional nitrogen atom (not more than two hetero atoms altogether), that is, the two symbols $R_3$ and $R_4$ represent together tetramethylene, pentamethylene, hexamethylene, oxapentamethylene, oxatetramethylene, azahexamethylene, azapentamethylene, azatetramethylene, thiapentamethylene or thiatetramethylene. The heterocyclic group may also be substituted by one or two groups represented by $R_2$ and hydroxy-lower alkyl in addition.

Illustrative heterocyclic groups include piperidino, e.g., methylpiperidino, di(lower alkyl)piperidino, e.g., dimethylpiperidino, (lower alkoxy)piperidino, e.g., methoxypiperidino, pyrrolidino, (lower alkyl)pyrrolidino, e.g., 2-methylpyrrolidino, di(lower alkyl)pyrrolidino, e.g., 2,6-dimethylpyrrolidino, (lower alkoxy)pyrrolidino, e.g., ethoxypyrrolidino, morpholino, (lower alkyl)morpholino, e.g., N-methylmorpholino or 2-methylmorpholino, di(lower alkyl)morpholino, e.g., 2,3-dimethylmorpholino, (lower alkoxy)morpholino, e.g., 2- or 3-ethoxymorpholino, thiamorpholino, (lower alkyl)thiamorpholino, e.g., N-methylthiamorpholino or 2-methylthiamorpholino, di(lower alkyl)thiamorpholino, e.g., 2,3-diethylthiamorpholino or 2,3-dimethylthiamorpholino, (lower alkoxy)thiamorpholino, e.g., 2-methoxythiamorpholino, piperazino, (lower alkyl)piperazino, e.g., 4-methylpiperazino, 2-methylpiperazino, di(lower alkyl)piperazino, e.g., 2,3-dimethylpiperazino, hydroxy-lower alkylpiperazino, e.g., 4-(2-hydroxyethyl)piperazino, hexamethyleneimino and homopiperazino.

The adamantyl groups represented by $R_3$ and $R_4$ include unsubstituted adamantyl and simply substituted adamantyl, e.g., 3-$R_5$, 5-$R_6$-adamantyl, wherein $R_5$ and $R_6$ each represents hydrogen, lower alkyl, phenyl, hydroxy and lower alkoxy as indicated above. Preferably only one of $R_3$ and $R_4$ is adamantyl or substituted adamantyl and the other is hydrogen.

The preferred members of the class defined by Formula I are those wherein R, $R_1$ and $R_2$ are all hydrogen, the basic group is di(lower alkyl)amino, especially dimethylamino, n is 2, X is sulfur and Y is oxygen.

DETAILED DESCRIPTION OF THE INVENTION

The new compounds of this invention may be prepared by reacting a compound of the formula (III)

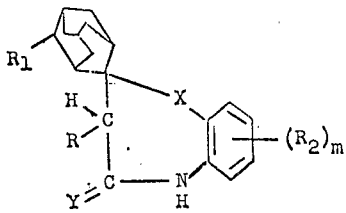

wherein X is thia, Y is oxo and R, $R_1$, $R_2$ and $m$ have the previously defined meanings, with a lower alkyl halide of the formula (IV)

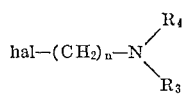

wherein the symbols have the previously defined meanings and hal represents a halogen, preferably chlorine or bromine. This reaction is preferably conducted by treating the reactants in the presence of a basic condensing agent, e.g., an alkali metal, an alkali metal amide such as sodamide, or an alkali metal hydroxide such as sodium or potassium hydroxide.

The resulting products may be converted to those compounds of Formula I wherein Y is $H_2$ by reduction, e.g., with an alkali metal hydride at about 30–60° C. in an inert organic solvent such as ether or tetrahydrofuran.

Those compounds of Formula I wherein X is sulfinyl or sulfonyl and Y is oxygen or hydrogen may be produced by treating the compounds of Formula I in which X is sulfur with an oxidizing agent such as hydrogen peroxide (to obtain X=sulfinyl) or potassium permanganate or a peracid such as peracetic acid (to obtain X=sulfonyl).

The starting material of Formula III where X is sulfur and Y is oxygen may be produced by reacting an appropriately substituted 2-aminobenzenethid with a $\Delta^2$, α-adamantane acid of the formula (V)

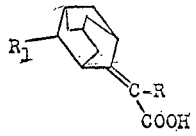

The compounds of Formula V are produced by reacting an adamantyl ketone of the formula (VI)

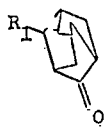

with triethylphosphonoacetate of Formula VII (R=H or lower alkyl)

(VII)

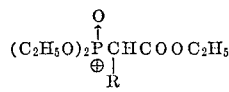

and sodium hydride in an inert solvent like 1,2-dimethoxyethane to obtain an ester of the formula (VIII)

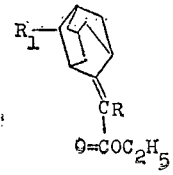

Alternatively, a cyanoalkyl phosphate of the formula (IX)

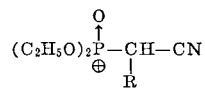

will react with an adamantyl ketone of Formula VI in the presence of sodium hydride to give a compound of the formula (X)

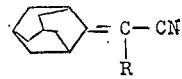

Hydrolysis of the compound of Formula VIII or Formula X, e.g., by refluxing with alcoholic potassium hydroxide solution for about two to four hours, yields the $\Delta^2$, α-adamantane acid of Formula V.

Suitable starting materials which may be utilized in preparing compounds of this invention include: 2-aminobenzenethiol; halo-2-aminobenzenethiols, such as 4-chloro-2-aminobenzenethiol, 4-bromo-2-aminobenzenethiol, 5-chloro-2-aminobenzenethiol and 4,6-dichloro-2-aminobenzenethiol; (lower alkyl)-2-aminobenzenethiols, such as 5-methyl-2-aminobenzenethiol, 4-ethyl-2-aminobenzenethiol, 4,6-dimethyl-2-aminobenzenethiol, and 3,4,5-trimethyl-2-aminobenzenethiol; (lower alkoxy)-2-aminobenzenethiols, such as 4-methoxy-2-aminobenzenethiol, 5-ethoxy-2-aminobenzenethiol, 4,6-diethoxy-2-aminobenzenethiol and 3,4,5-trimethoxy-2-aminobenzenethiol; $\Delta^2$,α-adamantaneacetic acid; 4-methyl-$\Delta^2$,α-adamantaneacetic acid, 4-phenyl-$\Delta^2$,α-adamantaneacetic acid, 4-methoxy-$\Delta^2$,α-adamantaneacetic acid, 4-fluoro-, 4-chloro-, 4-bromo- and 4-iodo-$\Delta^2$,α-adamantaneacetic acid, 4-hydroxy-$\Delta^2$,α-adamantaneacetic acid, $\Delta^2$,α-adamantane-propionic acid, 4-ethoxy-$\Delta^2$, α-adamantane propionic acid and the like.

The bases of Formula I form acid-addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide and the base in turn can be transformed into a different salt by reaction with the appropriate acid.

The new compounds of this invention have activity upon the central nervous system and are especially active as antidepressants. They are useful in the alleviation of depressed states in mammals, e.g., rats, dogs or cats. They may be administered orally or parenterally in the form of tablets, capsules, elixirs, injectables or the like by incorporating the appropriate dosage of the base of Formula I or a physiologically acceptable acid addition salt thereof, e.g., about 10 to 500 mg., preferably about 25 to 200 mg., per day in two to four divided doses, in a conventional vehicle according to accepted pharmaceutical practice.

The following examples are illustrative of the invention. All temperatures are on the centigrade scale.

EXAMPLE 1

(a) 2-adamantanone

A mixture of 100 ml. of concentrated $H_2SO_4$ and 24.6 g. (0.16 mole) of 1-hydroxyadamantane is heated with stirring on the steam bath for 4.5 hours. At the end of the period, the dark red solution is poured onto crushed ice, and the mixture extracted with 300 ml. of ether. After washing the ether layer to neutrality, it is dried ($MgSO_4$). Evaporation of the ether gives 15.0 g. (62%)

of 2-adamantanone as a white solid. It is further purified by steam distillation followed by crystallization from cyclohexane; M.P. 260–265°.

(b) $\Delta^2,\alpha$-adamantaneacetic acid, ethyl ester

To a well stirred suspension of 2.8 g. of sodium hydride dispersed in 75 ml. of dry 1,2-dimethoxyethane, 13.45 g. (0.06 mole) of triethylphosphonoacetate are added dropwise at 20° (addition time 1 hour). After the addition, the mixture is stirred for one hour at room temperature. To the resulting yellow solution, a solution of 9.0 g. (0.06 mole) of 2-adamantanone in 75 ml. of dry 1,2-dimethoxyethane are added at such a rate as to maintain the temperature between 20–30°. The mixture is then stirred overnight at room temperature. The mixture is concentrated, diluted with 100 ml. of water, and extracted with 3× 300 ml. of ether. After drying (MgSO$_4$) the ether is removed in vacuo to give 10.3 g. (77%) of $\Delta^2,\alpha$-adamantaneacetic acid ethyl ester as a thick oil. The crude product is used as such for the next step.

(c) $\Delta^2,\alpha$-adamantaneacetic acid

To a solution of 10.3 g. of $\Delta^2,\alpha$-adamantaneacetic acid ethyl ester in 250 ml. of ethyl alcohol, 150 ml. of an aqueous KOH solution (25%) is added, and the mixture is heated under reflux for 4 hours. The mixture is concentrated in vacuo, diluted with water and extracted with chloroform (200 ml.) to remove the insoluble impurities. The basic solution is cooled, acidified with 5 N HCl, and the solid that separates is extracted with chloroform (3× 250 ml.). The chloroform is washed with water, dried (MgSO$_4$) and evaporated in vacuo to give 6.8 g. (79%) of $\Delta^2,\alpha$-adamantaneacetic acid as a brownish-white powder. It is crystallized from dilute acetone to give yellowish needles; M.P. 136–138°.

(d) Spiro[adamantane-2,2'(3'H)-1',5'-benzothiazepin-4'(5H)-one]

A mixture of 5.75 g. (0.03 mole) of $\Delta^2,\alpha$-adamantaneacetic acid, 15.0 g. of aminobenzenethiol, and 5 ml. of dimethylformamide are heated under an atmosphere of nitrogen at 218–222° for 3 hours. After cooling, the reaction mixture is stirred with 200 ml. of ether, and the solid that separates is collected and crystallized twice from chloroform-ether to give 2.1 g. (23%) of spiro [adamantane-2,2'(3'H)-1',5' - benzothiazepin - 4'(5H)-one] as shiny white crystals, M.P. 281–283°.

(e) 5'-[2-(dimethylamino)ethyl]spiro[adamantane-2,2' (3'H)-1',5'-benzothiazepin-4'(5H)-one]hydrochloride To a suspension of 0.21 g. of sodium amide in 25 ml. of dry toluene, a suspension of 1.5 g. (0.005 mole) of the product of part d in 50 ml. of dry toluene is added at 10–15°, and the reaction mixture is stirred at 20° for 0.5 hour when a practically clear solution is obtained. To the above reaction mixture a solution of dimethylaminoethyl bromide in dry toluene (made from 1.75 g. of dimethylaminoethyl bromide hydrobromide and 0.6 g. of K$_2$CO$_3$) is added dropwise and the mixture is stirred overnight. The toluene solution is washed with water, dried and concentrated. The thick oily base thus obtained is taken up in dry isopropyl alcohol and treated with an equivalent amount of ethereal HCl to give 0.95 g. (47%) of the hydrochloride salt as a white solid. It is crystallized twice from alcohol-ether to give 0.48 g. (24%) of crystals, M.P. 250–251°.

EXAMPLE 2

Preparation of 5'-[2-(dimethylamino)ethyl]-4',5' - dihydrospiro[adamantane-2,2'(3'H)-1',5'- benzothiazepine] hydrochloride A solution of 67 grams of 5'-[2-(dimethylamino) ethyl]spiro[adamantane-2,2'(3'H)-1',5' - benzothiazepin-4'(5'H)-one] hydrochloride in 200 ml. of water is treated with a cold solution of 22 grams of potassium carbonate in 50 ml. of water. The liberated base is extracted with ether and dried over anhydrous magnesium sulfate and finally over anhydrous calcium sulfate. The ether solution is then added dropwise to a stirred slurry of 6.1 grams of lithium aluminum hydride in 500 ml. of anhydrous ether. The mixture is stirred for twenty-four hours at room temperature, cooled in an ice-bath and treated dropwise with 20 ml. of water followed by a solution of 5 grams of sodium hydroxide in 50 ml. of water. The mixture is stirred for two hours at room temperature. The mixture is filtered, dried over anhydrous magnesium sulfate and then concentrated to yield the crude product. This product is dissolved in absolute ethanol and treated with an equivalent amount of an alcoholic solution of hydrogen chloride. The resulting solution is diluted with anhydrous ether and the mixture cooled and filtered to yield the desired compound. This hydrochloride may be purified by crystallization from acetonitrile or ethanol-ether.

EXAMPLE 3

5'-[2 - (dimethylamino)ethyl]spiro[adamantane - 2,2' 3'H)-1',5'-benzothiazepin-4'(5'H)-one 1',1' - dioxide] hydrochloride An aqueous solution of 16.8 grams of the product of Example 1 is made alkaline with sodium hydroxide solution and then extracted with ether. The ether extracts are combined, dried over magnesium sulfate and then concentrated to remove the solvent. The base so obtained is dissolved in 200 ml. of acetic acid and to this solution there is slowly added, with vigorous stirring, a solution of 12.7 grams of potassium permanganate in 200 ml. of water. The temperature is kept between 25° and 30° by external cooling, during this addition. After the addition is completed. an aqueous solution of sodium bisulfite is added to dissolve the precipitated manganese dioxide. After the addition of 400 ml. of water, the reaction mixture is made alkaline by the addition of potassium carbonate. The mixture is extracted several times with chloroform, and the combined chloroform extracts dried over anhydrous magnesium sulfate. Concentration of the solvent yields the crude base.

The base is dissolved in absolute ethanol and treated with an equivalent of ethanolic hydrogen chloride. Anhydrous ether is added and the precipitated solid filtered to yield the desired compound. This may be recrystallized from a mixture of ethanol and ether.

EXAMPLE 4

Preparation of 5'-[2-(dimethylamino)ethyl]spiro[adamantane - 2,2' - (3'H) - 1',5' - benzothiazepin - 4' (5'H)-one 1'-oxide] hydrochloride.

A solution of 11.5 grams of 5'-[2-(dimethylamino) ethyl]spiro[adamantane 2,2'(3'H)-1',5'-benzothiazepine-4'(5'H)-one] in 50 ml. of acetic acid is treated with 3.5 grams of 30% hydrogen peroxide solution. The reaction mixture is allowed to remain at room temperature for twenty-four hours and is then diluted with 400 ml. of water. The mixture is made alkaline with potassium carbonate and is extracted with chloroform. The chloroform extract is washed with water, dried over anhydrous magnesium sulfate and concentrated under reduced pressure to yield 5'-[2-(dimethylamino)ethyl]spiro[adamantane-2,2'(3'H) - 1l',5' - benzothiazepin-4'(5'H)-one 1'-oxide]. A solution of this base is then treated with an ethereal solution of hydrogen chloride to yield the hydrochloric acid salt of the above named product.

EXAMPLE 5

5'-[2-(morpholino)ethyl]spiro[adamantane-2,2'(3'H)-1'5'-benzothiazepin-4'(5H)-one]hydrochloride Following the procedure of Example 1(e), but substituting an equivalent amount of 2-morpholinoethyl chloride for the dimethylaminoethyl bromide, there is obtained the above product.

Similarly, by following the procedure of Example 1, but substituting the indicated basic bromide for the dimethylaminoethyl bromide in part (e), the designated 5'-(R₇) spiro]adamantane - 2,2'(3'H) - 1',5' - benzothiazepine - 4'(5'H)one] as a monohydrochloride or dihydrochloride.

| Example | Reactant | Product: R₇ is— |
|---|---|---|
| 6 | Diethylaminoethyl bromide | Diethylaminoethyl. |
| 7 | Piperidinoethyl bromide | Piperidinoethyl. |
| 8 | 4-methylpiperazinoethyl bromide. | 4-methylpiperazinoethyl. |
| 9 | 3-dimethylaminopropyl bromide. | 3-dimethylaminopropyl. |

By following the procedure of Example 1, but substituting the indicated substituted 2-adamantanone for the 2-adamantanone in part (f), the designated 5'-[2-(dimethylamino)ethyl]spiro[substituted adamantane-2,2'(3'H)-1', 5'-benzothiazepin-4'(5'H)one] hydrochloride is obtained.

| Example | Reactant | Product |
|---|---|---|
| 10 | 4-methyl-2-adamantanone | R₁=methyl. |
| 11 | 4-methoxy-2-adamantanone | R₁=methoxy. |
| 12 | 4-bromo-2-adamantanone | R₁=bromo. |
| 13 | 4-hydroxy-2-adamantanone | R₁=hydroxy. |

By following the procedure of Example 1, but substituting the indicated 2-aminobenzenethiol for the 2-aminobenzenethiol in part (d), the designated substituted 5'-[2-(dimethylamino)ethyl]spiro[adamantane - 2,2'(3'H) - 1', 5'-benzothiazepin-4'(5'H)-one hydrochloride is obtained.

| Example | Reactant | Product |
|---|---|---|
| 14 | 4-trifluoromethyl-2-aminobenzenethiol. | R₂=7-trifluoromethyl. |
| 15 | 5-chloro-2-aminobenzenethiol | R₂=8-chloro. |
| 16 | 5-methyl-2-aminobenzenethiol | R₂=8-methyl. |
| 17 | 4,6-dimethyl-2-aminobenzenethiol | R₂=7,9-dimethyl. |

EXAMPLE 18

Preparation of 5'-[2-(dimethylamino)ethyl]-3'-methylspiro[adamantane - 2,2'(3'H) - 1',5' - benzothiazepin-4'(5'H)-one] hydrochloride (a) Preparation of Δ²,α-adamantanepropionic acid.—Following the procedure of Example 1(b) but substituting an equivalent amount of 1-diethyl cyanoethylphosphonate for triethylphosphonoacetate, Δ²,α-adamantane propionic acid is obtained.

(b) Preparation of 3'-methyl-spiro[adamantane-2,2'(3'H)-1',5'-benzothiazepin-4'(5'H)-one.—Following the procedure of Example 1(d) but substituting an equivalent amount of Δ²,α-adamantanepropionic acid for Δ²,α-adamantaneacetic acid, the above named compound is obtained.

(c) Preparation of 5'-[2-(dimethylamino)ethyl]-3'-methyl] - 3' - methyl - spiro[adamantane - 2,2'(3'H)-1',5'-benzothiazepin-4'(5'H)-one, hydrochloride.—Following the procedure of Example 1(e) but substituting an equivalent amount of the product of Example 18(b) for 1(d) the above named compound is obtained.

What is claimed is:
1. A compound of the formula

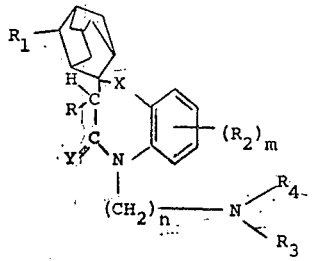

wherein R is hydrogen or lower alkyl, R₁ is hydrogen, halo, hydroxy, lower alkyl, lower alkoxy or phenyl, R₂ is hydrogen, lower alkyl, trihalomethyl, lower alkoxy or halo, X is thia, sulfinyl, or sulfonyl, Y is H₂ or oxo, m is 1 to 3, n is 1 to 4, the group

is amino, lower alkylamino, di(lower alkyl) amino, (hydroxy-lower alkyl)amino, di(hydroxy-lower alkyl)amino, phenyl(lower alkyl)amino, piperidino, (lower alkyl)piperidino, di(lower alkyl)piperidino, (lower alkoxy)piperidino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy) thiamorpholino, piperazino, (lower alkyl)piperazino, di(lower alkyl)piperazino, hydroxy-lower alkylpiperazino, hexamethyleneimino or homopiperazino, and acid addition salts thereof.

2. A compound as in claim 1 wherein R, R₁ and R₂ each is hydrogen, X is thia, Y is oxo, R₃ and R₄ each is lower alkyl, m is 1 and n is 2.

3. A compound as in claim 2 wherein each lower alkyl group is methyl.

4. A compound as in claim 1 wherein R, R₁ and R₂ each is hydrogen, X is thia, Y is H₂, R₃ and R₄ each is lower alkyl, m is 1 and n is 2.

5. A compound as in claim 1 wherein R, R₁ and R₂ each is hydrogen, X is sulfonyl, Y is oxo, R₃ and R₄ each is lower alkyl, m is 1 and n is 2.

6. A compound as in claim 1 wherein R, R₁ and R₂ each is hydrogen, X is sulfinyl, Y is oxo, R₃ and R₄ each is lower alkyl, m is 1 and n is 2.

7. A compound as in claim 1 wherein R, R₁ and R₂ each is hydrogen, X is thia, Y is oxo, the group

is morpholino, m is 1 and n is 2.

8. A compound as in claim 1 wherein R, R₃ and R₄ each is methyl, R₁ and R₂ each is hydrogen, X is thia, Y is oxo, m is 1 and n is 2.

9. Spiro[adamantane - 2,2'(3H) - 1',5' - benzothiazepin-4'(5H)-one.

References Cited

UNITED STATES PATENTS 3,322,752   5/1967   Bernstein _____ 260—239.3

HENRY R. JILES, Primary Examiner

R. T. BOND, Assistant Examiner

U.S. Cl. X.R.

260—327 B, 247.1, 268 R, 268 PC, 293.43, 326.81, 243 B